Feb. 10, 1931.  J. D. WALLACE ET AL  1,792,204
ELECTRIC HAND SAW
Filed Feb. 17, 1930   2 Sheets-Sheet 1
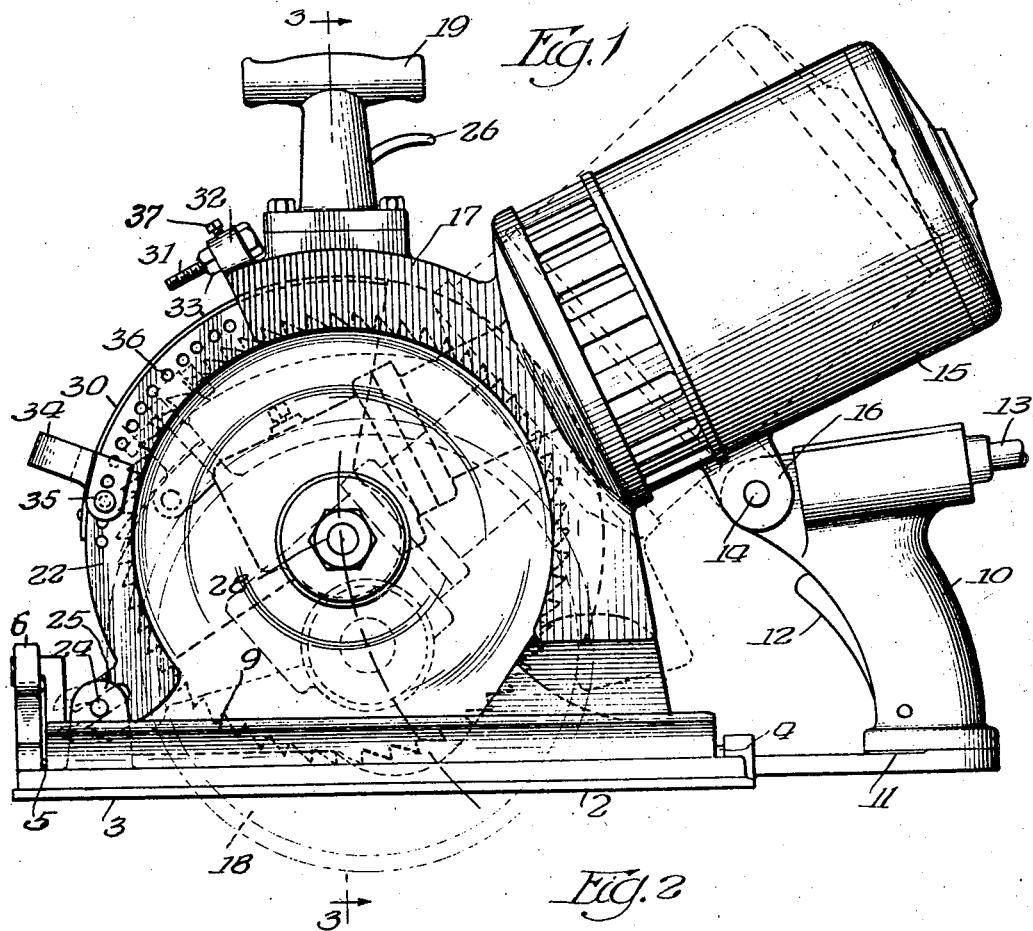
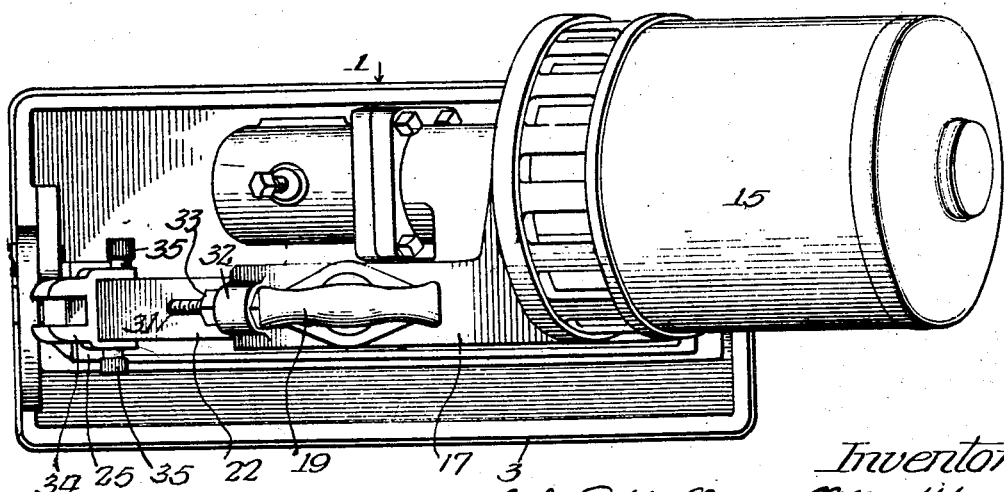

Feb. 10, 1931.  J. D. WALLACE ET AL  1,792,204
ELECTRIC HAND SAW
Filed Feb. 17, 1930  2 Sheets-Sheet 2
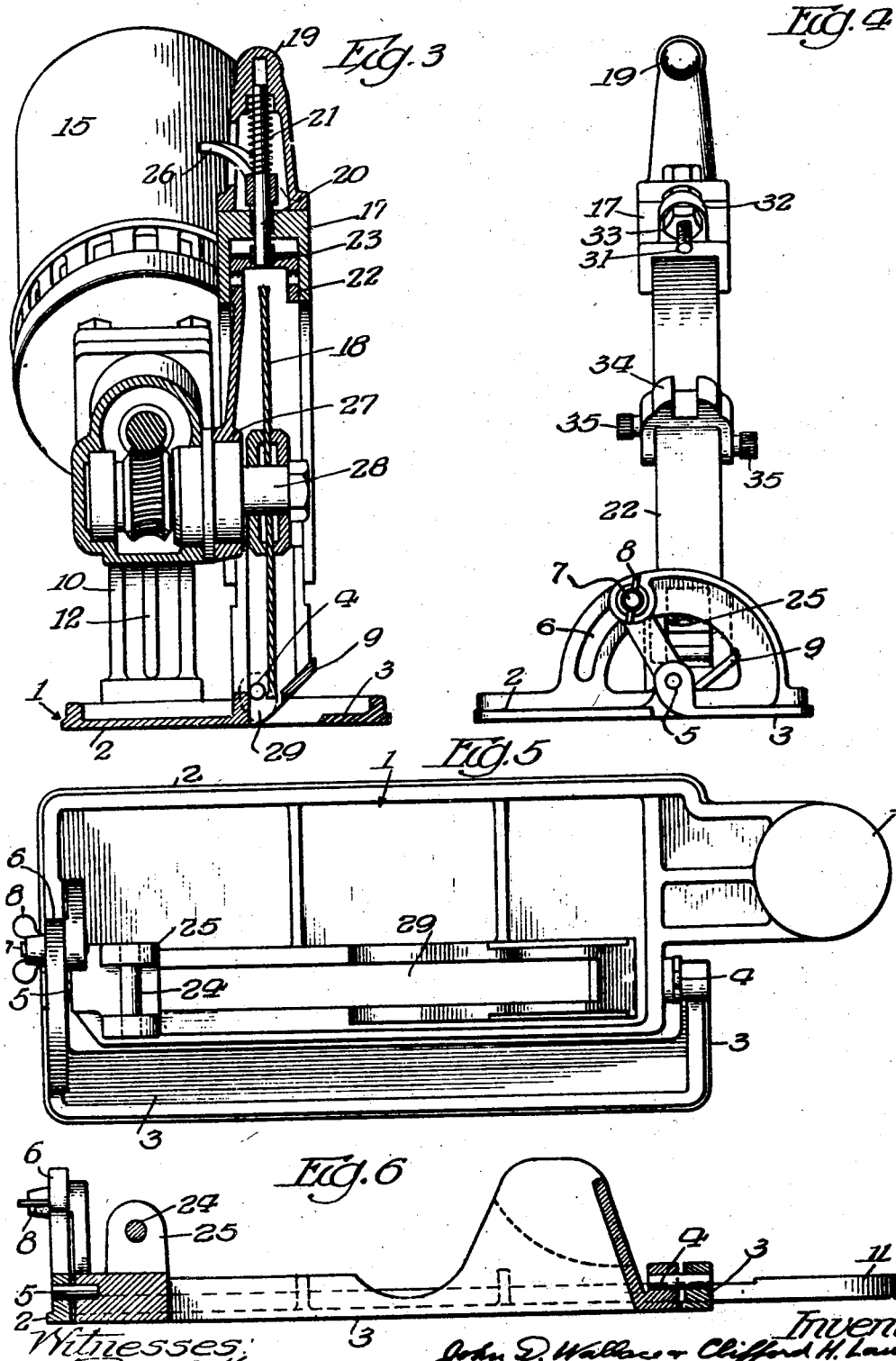

Patented Feb. 10, 1931

1,792,204

UNITED STATES PATENT OFFICE

JOHN D. WALLACE AND CLIFFORD H. LANDIS, OF CHICAGO, ILLINOIS, ASSIGNORS TO J. D. WALLACE & COMPANY, OF CHICAGO, ILLINOIS, A CORPORATION OF ILLINOIS

ELECTRIC HANDSAW

Application filed February 17, 1930. Serial No. 429,098.

This invention relates to electric hand saws of the class having circular rotary saw blades which are normally fully guarded and latched in the guarded position, the motor and saw driven thereby being tiltable around the supporting base so that more or less of the saw moves into the cutting position at the desire of the operator.

The purposes of this invention are to improve saws of this class to render them more convenient in making miter cuts of any desired angle; to provide an improved arrangement of operating handles whereby the motor may be held in one hand and the supporting shoe in the other, whereby the operator may easily control the positioning of the saw with respect to its guard.

A further purpose of the invention is to provide improved means for positively limiting the depth of cut to an exact measurement, including means for locking the device with its parts in such set relationship.

The objects are accomplished by the construction illustrated in the drawings, in which:

Figure 1 shows the improved electrical hand saw in side elevation and shows by broken lines the tiltable parts of the saw as they would appear in relation to the supporting structure when making a cut.

Figure 2 is a plan view.

Fig. 3 is a sectional view taken on the line 3—3 of Fig. 1.

Fig. 4 is a front end detail showing the saw guard and the fixed and movable supporting bases.

Fig. 5 is a detail in plan of the supporting base part of the construction.

Fig. 6 is a longitudinal sectional detail of the supporting base.

In the following description reference will be made to the general arrangement of the hand saw such as disclosed in the patent to applicants No. 1,672,238 of June 5, 1928, but the novel features which it is desired to particularly disclose in the present application for patent are the supporting base structure which includes, in addition to the horizontal shoe element a fixed 45° guide, an angularly adjustable guide, also the arrangement of operating handles whereby one is fixed to the supporting structure and the other to the tiltable motor frame and parts carried thereby, the specific construction of latching means carried by the last mentioned handle, and the improved depth gauging means whereby is controlled the distance to which the rotary saw blade may pass beyond the face of the supporting base.

The supporting base 1 as shown particularly in Fig. 5 provides the plain surface 2 for resting upon the material operated upon when a cut is made at right angles to such surface. Angular cuts are provided for by the adjustable shoe element 3. The shoe 3 is supported upon the shoe 1 by short shafts 4 and 5, Fig. 6, and at one end is provided a bolt 7 extending through an arcuate slot 6 in the shoe 1 and provided with the winged nut 8. The shoe 3 may therefore be tilted around its pivotal connection with the shoe 1 and clamped in the desired angular relationship therewith by means of the nut 8.

When in such angular relationship with the shoe 1 an angular cut is to be made, the operator rocks the entire device to a position for resting upon the shoe 3 rather than the shoe 1. The shoe 3 is made removable, or it may be locked into alinement with the fixed 45° angle portion 9 of shoe 1. This 45° angle portion of the shoe 1 serves to strengthen the latter, and either alone or together with the adjustable shoe 3 serves as a rest for the machine when making 45° cuts. The shoe 1 has bolted rigidly thereto a handle 10 on the boss 11 at one end of shoe 1. The handle 10 houses a switch for the motor which is operated by the trigger 12. In Fig. 1 a flexible conduit 13 is shown entering the upper end of the handle. This conduit carries the leading in wires to the switch in the handle and other flexible wires lead from the switch around the pivot 14 to the motor.

The motor frame 15 has downwardly extending ears 16 to form a journaled connection with the handle 10. Also integral with the motor frame is an arcuate guard 17 partially enclosing the saw disc 18, Fig. 3. The arcuate guard 17 has securely clamped thereto a handle 19. In the use of the saw this handle is held by one hand, while handle 10 is held by the other. Therefore, the operator may, by pressure on the handle 19 tilt the motor frame and parts carried thereby with reference to the supporting base 1. Normally, when not making a cut the relationship is that shown by full lines in Figure 1. A latching pin 20, Fig. 3, vertically movable within the hollow handle 19 and against the action of spring 21, by engaging a shiftable guard 22 at the aperture 23 therein serves to lock the mechanism in non-cutting relationship.

The guard 22 is of arcuate form to partly encircle the saw, and is forked at its lower front end to engage a pivot pin 24. The pin 24 is supported between a pair of ears 25 on the base 1.

When it is desired to rock the motor frame and saw downwardly around its pivotal support 14 on handle 10 the latching pin 20 is withdrawn from the aperture 23 by pressing upwardly on the grip 26, extending outwardly through a slot in handle 19, and secured to the pin 20, then by permitting the motor frame to rock downwardly around the pivot 14, the saw passes below the supporting base 1 into position for making a cut. As the motor frame structure rocks downwardly around the pivot 14, Fig. 1, the arcuate guard 22, which as shown in Fig. 3 is centrally supported at its bearing 27 around the axis of the saw spindle 28, rocks to the right, Figure 1, around the saw spindle and around its pivotal support 24. It thus telescopes with the guard 17 as the saw blade moves downwardly through the slot 29 in shoe 1. The motor frame, shoes and guards, and handles are preferably made of aluminum for lightness, and in order to prevent the pin 20 from abrading the surface of the guard 22 this guard is provided with a protecting steel band 30 along the path of travel of the pin 20 upon its surface.

For the purpose of limiting the depth of cut of the saw blade 18 the guard 17 and the guard 22 are provided with coacting stop elements. At the front end of guard 17 a screw 31 projects forwardly from a boss 32 on the guard. This screw is fixed against rotation by set screw 37 and carries a nut 33 which acts as a stop for limiting the motion of the two guards toward one another by engagement with the upper surface of the jawed stop 34 carried by the guard 22.

The stop 34 is secured to guard 22 by screws 35 which enter holes 36 in the guard and which are spaced one-half inch apart in order to allow for rough adjustment of the stop. The fine adjustment is provided for by the nut 33 on screw 31. This stop mechanism also allows for setting the structure so that the saw blade may permanently project a desired distance beyond the supporting base by removing the nut 33 and replacing it upon the end of the screw 31 when the latter projects through the adjustable jaw stop 34 or the nut 33 may remain in its normal position and another nut be applied to the end of the screw.

In operating the device it is grasped by the two handles 10 and 19, the motor being started and stopped as desired by pressure upon the trigger 12. The device is released to permit the saw to make a cut by upward pressure on the member 26 projecting from the handle 19. The distance the saw is permitted to pass downwardly through the supporting shoe structure 1, 3 and 9, is gauged by the adjustable stop 34 cooperating with the nut 33, as the saw guard 22 interfolds with the other saw guard 17. During this action the guard 17 which is carried by the motor frame rocks with the latter around the pivot 14 while the guard 22 rocks toward the guard 17 around its pivotal supports at the saw spindle 28 and the pivot 24 on shoe 1.

We claim:—

1. In a power hand saw, a supporting base having a handle rigidly secured thereto, a motor frame pivotally supported on said handle, a saw carried by said motor frame, guarding means for the saw carried by said motor frame and pivotally connected to said base, a handle on said motor frame whereby the motor frame may be rocked with reference to the handle on the base and shift said guarding means according to the rocking motion of the motor frame.

2. In a power hand saw a supporting base, a motor frame and saw unit, said supporting base being provided with a fixed supporting surface at right angles to the plane of the saw on one side of the saw and another supporting fixed surface on the other side of the saw arranged at a different angle with respect to the plane of the saw, and another supporting element pivotally and adjustably connected with the supporting base.

3. In a power hand saw a supporting structure, a motor frame and saw carried thereby mounted upon said structure for relative movement thereof, arcuate saw guarding means carried by said motor frame and coacting with the base to move around the saw upon relative movement between the motor frame and base, means for limiting such relative movement, said means comprising a stop element on the guard and a coacting stop element on the motor frame, and means for securing said stops together.

Signed at Chicago this 13th day of February, 1930.

JOHN D. WALLACE.
CLIFFORD H. LANDIS.